(12) United States Patent
Ruby

(10) Patent No.: US 11,657,853 B1
(45) Date of Patent: May 23, 2023

(54) DECORATIVE CD/RADIO PLAYER

(71) Applicant: Dale Ruby, Mt. Jackson, VA (US)

(72) Inventor: Dale Ruby, Mt. Jackson, VA (US)

( * ) Notice: Subject to any disclaimer, the term of this patent is extended or adjusted under 35 U.S.C. 154(b) by 0 days.

(21) Appl. No.: 17/682,593

(22) Filed: Feb. 28, 2022

(51) Int. Cl.
    *G11B 33/02* (2006.01)

(52) U.S. Cl.
    CPC .................................. *G11B 33/02* (2013.01)

(58) Field of Classification Search
    USPC .................. D9/676; D21/552, 558
    See application file for complete search history.

(56) References Cited

U.S. PATENT DOCUMENTS

| | | | | |
|---|---|---|---|---|
| 2003/0224694 | A1* | 12/2003 | Hoeting | A63H 17/05 446/431 |
| 2006/0152939 | A1* | 7/2006 | Huang | B60Q 1/0483 362/509 |
| 2014/0057522 | A1* | 2/2014 | Stewart | A63H 5/00 446/71 |

FOREIGN PATENT DOCUMENTS

| | | | | |
|---|---|---|---|---|
| CN | 2388688 | Y | * | 7/2000 |
| CN | 2398803 | Y | * | 9/2000 |
| CN | 2427868 | Y | * | 4/2001 |
| CN | 2429895 | Y | * | 5/2001 |
| CN | 2494014 | Y | * | 5/2002 |
| JP | H0731750 | A | * | 2/1995 |

* cited by examiner

*Primary Examiner* — William J Klimowicz
(74) *Attorney, Agent, or Firm* — Lyman Moulton, Esq.; Moulton Patents, PLLC

(57) ABSTRACT

The tractor and trailer radio with. CD Player is the only product of its kind that has the capability of functioning as an alarm clock, a speaker, a charger, and a radio, yet showcases as an automotive small-scale accessory. This avant-garde product is uniquely designed with durable materials to ensure long term sustainability, and includes cutting-edge features such as wireless charging, illuminated cab lights and interchangeable volume and tune headlights for any AM/FM radio with the station numbers in the grill.

9 Claims, 2 Drawing Sheets

DECORATIVE CD/RADIO PLAYER

BACKGROUND

With today's technology advancing at such a rapid rate, electronic gadgets of all sorts have also significantly grown in popularity. Many of the current novelty objects such as physical musical player, however, tend to serve only one purpose and are unexciting, beyond nostalgia, in regards to their use and function. There have been no products available as original equipment or as an aftermarket to address this problem.

An fun novelty apparatus that can play music as well as other things is not being met by any known device or system at present. There have been no products available as original equipment or as an aftermarket to address this problem either.

SUMMARY OF THE INVENTION

The main purpose of the Tractor and Trailer Radio with CD player is to provide users with a multipurpose decorative CD player that also functions as an alarm clock.

Figure 1:
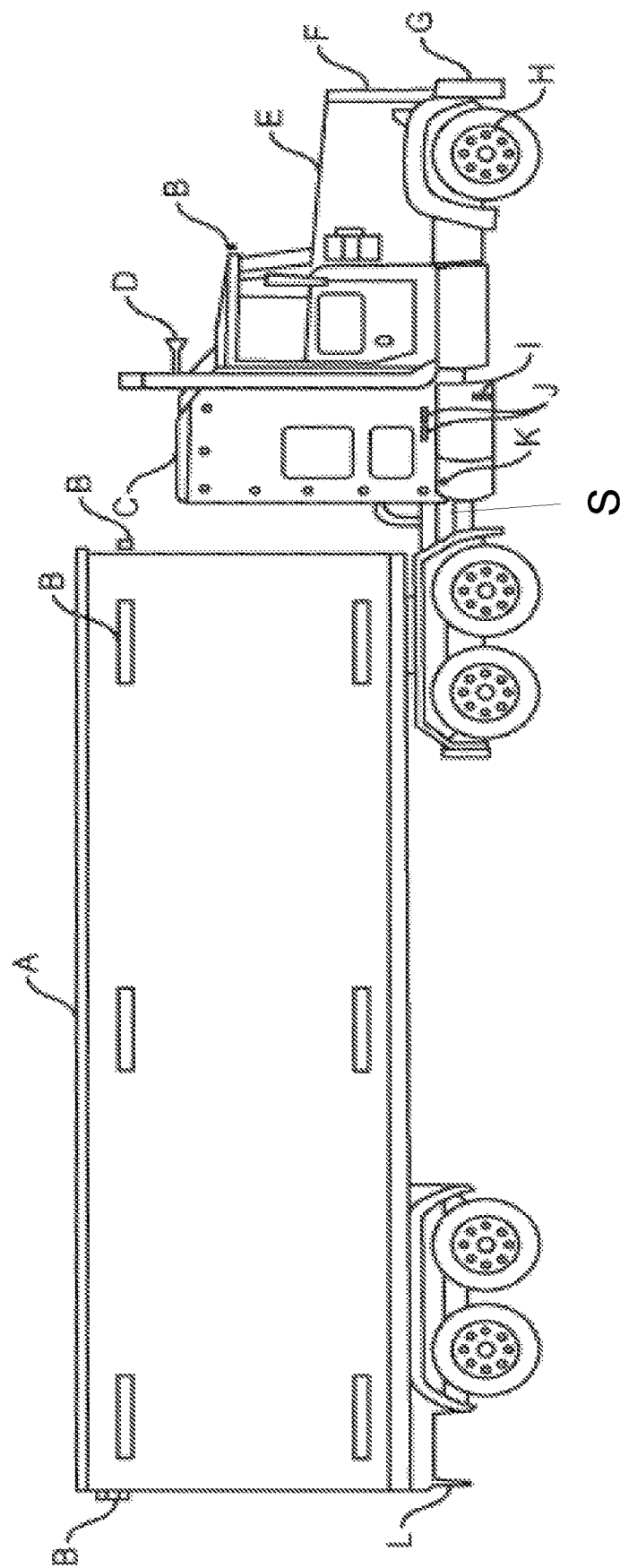
FIG. 1 is a right side elevational view of the decorative CD/Radio player in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same It will nevertheless be understood that no limitation of the scope of the disclosure is thereby intended. Alterations and further modifications of the inventive features illustrated herein and additional applications of the principles of the inventions as illustrated herein, Which would occur to one skilled in the relevant art and having possession of this disclosure, are to be considered within the scope of the invention.

FIG. 1 is a right side elevational view of the decorative CD/Radio player showing: CD library inside (lift the top to access) referenced as A, lights referenced as B, wireless circuit and controller circuit referenced as C, air horn for alarm clock referenced as D, Hood tilts forward to play CD referenced as E, digital clock referenced as F, headlights referenced as G, lights and speakers referenced as H, AM/FM dial/volume control/clock settings referenced as I, AUX and charging port referenced as J, power button referenced as K, rear lights referenced as L, and swivable electrical connector S between the tractor and the trailer in accordance with an embodiment of the present disclosure.

Figure 2:
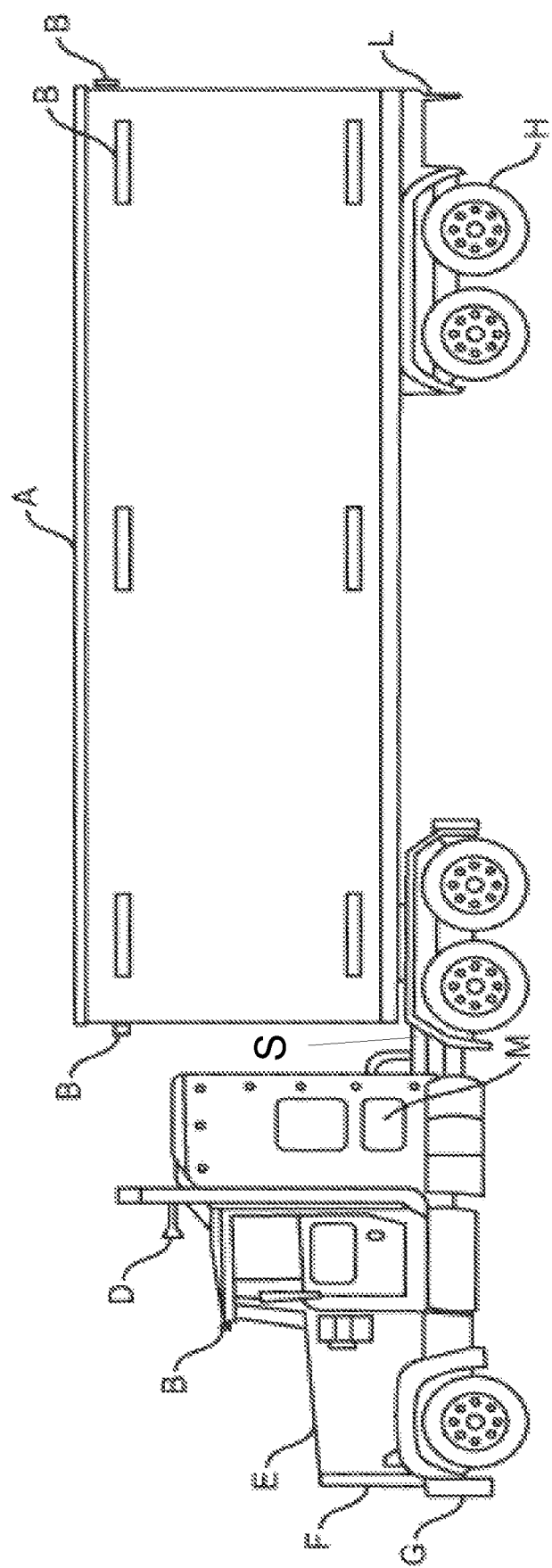
FIG. 2 is a left side elevational view of the decorative CD/Radio player in accordance with an embodiment of the present disclosure.

FIG. 2 is a left side elevational view of the decorative CD/Radio player showing: CD library inside (lift the top to access) referenced as A, lights referenced as B, air horn for alarm clock referenced as D, Hood tilts forward to play CD referenced as E, digital clock referenced as F, headlights referenced as G, lights and speakers referenced as H, rear lights referenced as L, electric cord storage referenced as M, and swivable electrical connector S between the tractor and the trailer in accordance with an embodiment of the present disclosure.

The present disclosed. Decorative CD/Radio player, also known as "The Tractor and Trailer Radio CD Player", expands on the initial design of a toy trailer, the tractor and trailer radio with CD player and introduces a novel tractor with a hood that tilts forward to hold a single CD.

Ingenious and practical, the tractor and trailer radio with CD player offers a modern accessory that permits consumers to access a multi-functional CD player in the shape of a tractor, that also operates as a speaker, a charger, and even a storage unit for collected CD's and other items. The tires on both the tractor and trailer operate as the speakers, which with advanced technology, can be connected either through a USB port or via Bluetooth connection. To further enhance functionality, this unprecedented product is also strategically built to function as an alarm clock with air horn sound that signals a preset time has arrived. Although. the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. A multimedia system for a CD compact disk and radio comprising:
   a CD library inside a trailer of a desktop decorative tractor and trailer combo;
   a scaled down truck air horn configured as a personal alarm clock;
   a scaled tractor trailer hood that tilts forward to receive and to play the CD;
   a plurality of scaled wheels configured as audio speakers;
   an electric cord storage configured in a cab space of the desktop decorative tractor and trailer combo; and
   a swivable electrical connection between the tractor and the trailer to transfer electric power therebetween the desktop decorative tractor and trailer combo.

2. The multimedia system of claim 1, further comprising a plurality of lights on the desktop decorative tractor trailer combo resembling lights on an actual tractor trailer.

3. The multimedia system of claim 1, further comprising a clock disposed in a grill of the desktop decorative tractor trailer combo.

4. The multimedia system of claim 1, further comprising a power button disposed on a gas tank of the desktop decorative tractor trailer combo.

5. The multimedia system of claim 1, further comprising a charging port for a battery of the desktop decorative tractor trailer combo disposed proximal the cab space thereof.

6. The multimedia system of claim 1, further comprising a dial volume control for the multimedia system configured as a gas tank of the desktop decorative tractor trailer combo.

7. The multimedia system of claim 1, further comprising signaling rear and side lights configured on the desktop decorative tractor trailer combo.

8. The multimedia system of claim 1, wherein a cab of the desktop decorative tractor trailer combo is configured as an electric cord storage with a lid.

9. The multimedia system of claim 1, wherein the desktop decorative tractor trailer combo is configured as a fully scaled model of an actual tractor trailer.

\* \* \* \* \*